United States Patent [19]

Leung et al.

[11] Patent Number: 5,293,491
[45] Date of Patent: Mar. 8, 1994

[54] DATA PROCESSING SYSTEM AND MEMORY CONTROLLER FOR LOCK SEMAPHORE OPERATIONS

[75] Inventors: Wan L. Leung; Richard A. Kelley, both of Coral Springs; Leslie F. McDermott, Lake Worth, all of Fla.

[73] Assignee: International Business Machines Corp., Armonk, N.Y.

[21] Appl. No.: 635,896

[22] Filed: Dec. 28, 1990

[51] Int. Cl.[5] .............................................. G06F 13/00
[52] U.S. Cl. ..................................... 395/275; 395/325; 395/425; 364/DIG. 1; 364/DIG. 2
[58] Field of Search ... 364/200 MS File, 900 MS File; 395/425

[56] References Cited

U.S. PATENT DOCUMENTS

| | | | |
|---|---|---|---|
| 4,394,725 | 7/1983 | Bienvenu et al. | 395/375 |
| 4,574,350 | 3/1986 | Starr | 395/725 |
| 4,644,496 | 2/1987 | Andrews | 395/800 |
| 4,718,002 | 1/1988 | Carr | 395/200 |
| 4,754,398 | 6/1988 | Pribnow | 395/200 |
| 4,805,106 | 2/1989 | Pfeifer | 395/650 |
| 5,050,072 | 9/1991 | Earnshaw et al. | 395/325 |
| 5,142,676 | 8/1992 | Fried et al. | 395/425 |
| 5,159,686 | 10/1992 | Chastain et al. | 395/650 |
| 5,163,143 | 11/1992 | Culley et al. | 395/425 |
| 5,179,665 | 1/1993 | Roslund et al. | 395/250 |

OTHER PUBLICATIONS

Mano, computer system architecture, 2nd edition, 1982, pp. 403-473.

Primary Examiner—Joseph L. Dixon
Assistant Examiner—Matthew Kim
Attorney, Agent, or Firm—George E. Grosser; Douglas R. McKechnie

[57] ABSTRACT

A local processor is connected to one port of a dual port memory controller. A bus having a BURST signal line is connected to the other port. The memory controller controls access to a local memory. A remote processor can perform a semaphore operation on a semaphore stored in the local memory by translating a LOCK signal from the remote processor into a bus BURST signal that is activated for a period allowing the remote processor to read and modify the semaphore. While the semaphore operation is being performed, the local processor can access the local memory.

10 Claims, 7 Drawing Sheets

DATA PROCESSING SYSTEM AND MEMORY CONTROLLER FOR LOCK SEMAPHORE OPERATIONS

FIELD OF THE INVENTION

This invention relates to the field of data processing, and, more particularly, to improvements in a multiprocessor system and in a memory controller usable in such system, wherein such system comprises an expansion bus provided with a burst signal line useable for both I/O burst transfers and lock semaphore operations.

BACKGROUND OF THE INVENTION

Multiprocessor systems commonly share resources such as a memory, by using a semaphore stored in either a designated memory location or a register, to establish reliable communications. A semaphore locking operation protocol is used to access the shared resource. Such protocol may involve the use of a lock prefix instruction followed by a bit test and change instruction such as a Bit Test and Set instruction. Such a sequence of instructions causes an active LOCK signal to be generated which signal is then used to block access to the shared resource by another processor or bus master. While the LOCK is active, the subsequent Bit Test and Set instruction accesses the semaphore and allows such bit to be set from a non-busy state to a busy state. The processor can then access the shared resource. If the semaphore bit is busy, the requesting processor must wait until the bit is set to a non-busy state before accessing the shared resource. The locking of the bus prevents more than one requestor from interfering with use of the semaphore.

Currently, some models of the well known, commercially available IBM PS/2 personal computers use a dual port memory that is connected at one port to a processor and at its other port to an expansion bus designed in accordance with the well known Micro Channel architecture. (IBM, PS/2, and Micro Channel are trademarks of International Business Machines Corporation). Under such architecture, the bus (also referred to herein as he MC bus) has no lock line dedicated to transmitting a processor LOCK signal. However, such bus does have a BURST signal line which allows the bus to perform a burst transfer in which a subsequent bus cycle will be granted a bus user so long as the BURST signal is active. The invention deals with improvements to such a system whereby the BURST signal can be used for both burst transfers and lock semaphore operations.

The closest patented art of which we are aware is believed to be U.S. Pat. No. 4,805,106—Pfeifer for METHOD OF AND ARRANGEMENT FOR ORDERING OF MULTIPROCESSOR OPERATIONS IN A MULTIPROCESSOR SYSTEM WITH REDUNDANT RESOURCES, which discloses using a dedicated bus read/write/modify signal line for semaphore operations. In contrast, the invention does not require a dedicated bus lock line but uses a bus BURST signal line to perform a semaphore operation in addition to I/O burst transfers. Further, the invention allows a local processor to access a memory controlled by a semaphore while the semaphore is being accessed.

SUMMARY OF THE INVENTION

Accordingly, one of the objects of the invention is provide a novel multiprocessing system, including an MC bus, and use the BURST signal line on the MC bus to provide a lock semaphore function without having to add an additional lock line.

Another object of the invention is to provide a novel memory controller for use in a multiprocessor system having an MC bus.

Yet another object of the invention is to allow a local processor to concurrently access a local memory while a remote processor is accessing a semaphore in such local memory.

Still another object of the invention is to provide a multiprocessor system having at least one local memory accessed through a dual port memory controller in which one port is connected to a local memory and the other port is connected to a bus that in turn is connected to a remote processor whereby the remote processor can perform a semaphore operation on the local memory while the local processor can concurrently access the local memory.

A further object is to provide a multiprocessor system in which a LOCK signal from a remote processor is translated into a BURST signal on a bus having no lock line, so as to allow such remote processor to perform a semaphore operation on a local memory.

Briefly, in accordance with the invention, a local processor is connected to one port of a dual port memory controller. A bus having a BURST signal line is connected to the other port. The memory controller controls access to a local memory. A remote processor can perform a semaphore operation on a semaphore stored in the local memory by translating a LOCK signal from the remote processor into a bus BURST signal that is activated for a period allowing the remote processor to read and modify the semaphore. While the semaphore operation is being performed, the local processor can access the local memory.

In accordance with another aspect of the invention, a memory controller is adapted to be connected to a processor, a memory and an MC bus to control lock semaphore operations on semaphores in such memory and at a remote location accessible over such bus. The controller includes means for controlling access to the local memory. The controller further includes logic to convert the processor LOCK signal into a BURST signal to access the remote semaphore.

DRAWINGS

Other objects and advantages of the invention will be apparent from the following description taken in connection with the accompanying drawings wherein.

DETAILED DESCRIPTION

Figure 1:
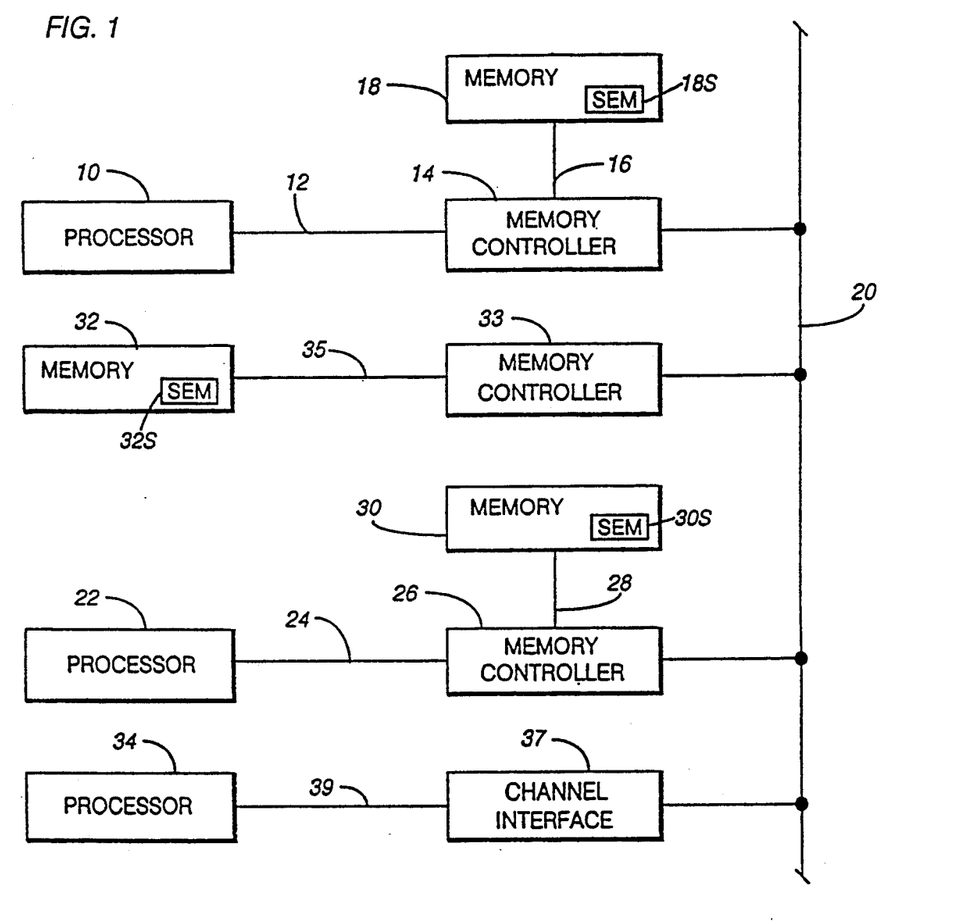
FIG. 1 is a block diagram of a data processing system embodying the invention.

Referring now to the drawings, and first to FIG. 1, a data processing system comprises a processor 10 connected by a system bus 12 to one port of a dual port memory controller 14. The controller is further connected by a memory bus 16 to a memory 18. The other port of controller 14 is connected to an MC bus 20 designed in accordance with the aforementioned Micro Channel architecture. A second processor 22 is connected by a system bus 24 to a dual port memory controller 26 which in turn is connected to bus 20. Controller 26 is further connected to a memory 30 by a memory bus 28. A third processor 34 is connected by a system bus 39 to a channel interface unit 37 which in turn is connected to MC bus 20. A third memory 32 is connected by a bus 35 to a memory controller 33 that in turn is connected to MC bus 20. There three memories respectively contain semaphore (SEM) 18S, 30S, and 32S at predetermined addresses therein. Such arrangement of a multiprocessor system was chosen to illustrate the invention and it should be obvious to those skilled in the art that various other arrangements can be used.

Memory controllers 14 and 26 include standard portions that allow the burst line of MC bus 20 to be used for conventional I/O burst transfers, such portions being part of the prior art and omitted for simplicity of illustration. Such controllers, however, are modified in accordance with the invention as described hereinafter. The remaining portions of the illustrated data processing system are constructed in accordance with known principles and preferably comprise well documented, commercially available devices so that further details thereof not necessary to an understanding of the invention are also omitted herefrom. It is to be understood that the many support, I/O and other devices commonly included in a data processing system have been omitted for simplicity of illustration.

Briefly, such data processing system comprises three processors 10, 22 and 34, and three physical memories 18, 32 and 30. Processor 22 can access memory 30 through its "local" controller 26 and access memories 18 and 32 through MC bus 20. Further, processor 10 can access memory 18 through its "local" controller 14 and access memories 30 and 32 through MC bus 20. Processor 34 can access memories 18, 30 and 32 only through MC bus 20.

Figure 2:
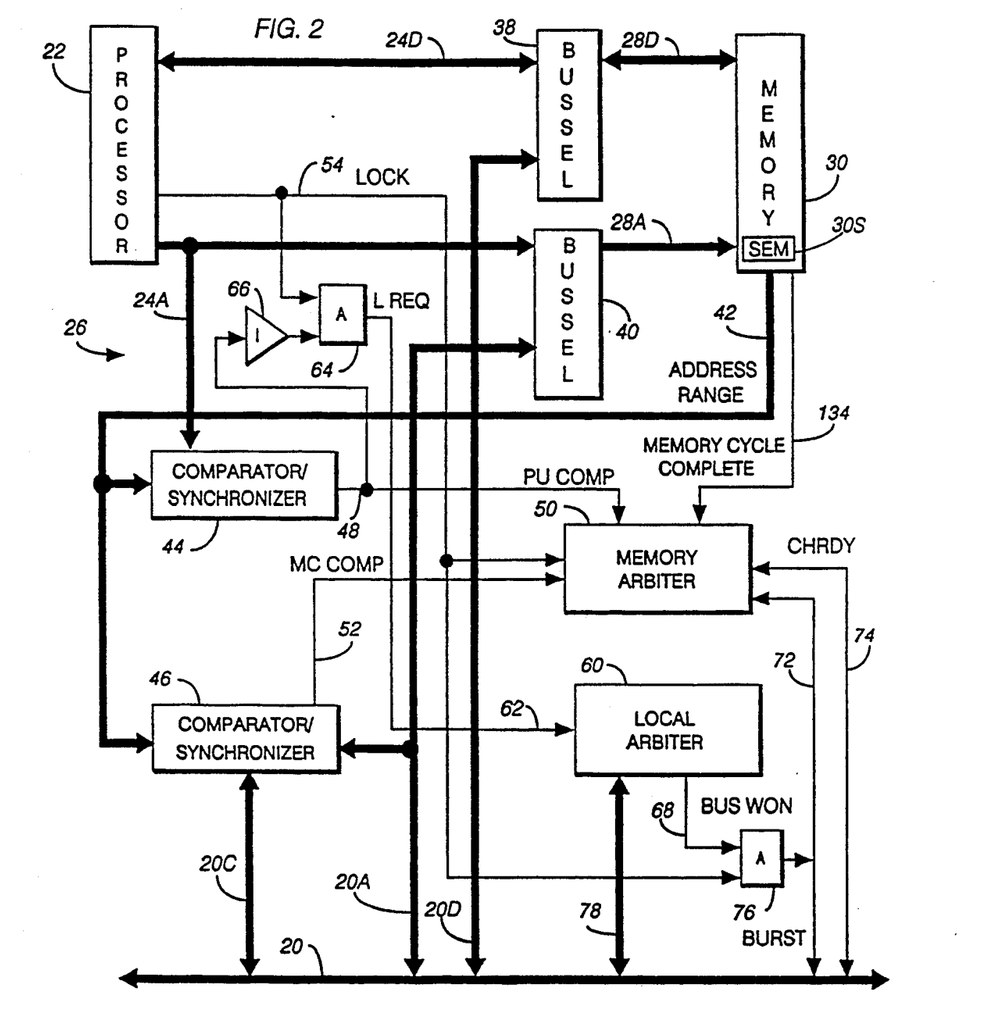
FIG. 2 is a more detailed block diagram of a portion of the system shown in FIG. 1.

Referring to FIG. 2, memory 30 is a shared resource that can be accessed by processor 22 over processor bus 24 or by processors 10 or 34 (FIG. 1) through MC bus 20. Processor 22 and memory 30 are considered "local" relative to each other while the other processors and memories are considered "remote" due to the intervening MC bus 20. Processor 22 and memory 30 are considered "remote" relative to the other processors and memories. Busses 24, 28 and 20 each comprise an address bus designated by the "A" suffix and a data bus designated by the "D" suffix, for transmitting addresses and data. Two bus selector circuits 38 and 40 respectively isolate the busses to control the gating of data and addresses from processor 22 and MC bus 20. When data is transferred between processor 22 and memory 30, it is transmitted along busses 24D and 28D. When data is being transferred between processor 22 and MC bus 20, it is transmitted on busses 24D and 20D. When data is being transferred between memory 30 and MC bus 20, it is transferred along busses 20D and 28D. Addresses are transmitted from processor 22 to memory 30 along address busses 24A and 28A, and from MC bus 20 along busses 20A and 28A.

Memory 30 is connected to a bus 42 and provides address range signals indicating the range of addresses within memory 30. Such range signals are fed into comparators and synchronizers (C/S) 44 and 46. C/S 44 is further connected to address bus 24A and is operative in response to an address signals being valid on bus 24A and address range signals being valid on bus 42 to assert an active signal PU COMP on a line 48. Such line is connected as an input to a memory arbiter 50 and an inverter 66. PU COMP indicates the address from processor 22 is in memory 30. C/S 46 is connected to MC address bus 20A and generates an active MC COMP signal on line 52 when an address on bus 20A is within the range of addresses on bus 42. C/S 46 is also connected to control line 20C of bus 20 to synchronize generation of the MC COMP signal with the timing of the MC bus. MC COMP indicates when an address from MC bus 20 is in memory 30. Line 52 is also connected as an input into memory arbiter 50. Processor asserts a LOCK signal on line 54 for a lock operation. Arbiter 50 decides, for a given memory cycle, which requestor (processor 22 or MC bus 20) will be given access to memory 30. As previously indicated, MC bus 20 has no "lock" line. Therefore, to provide the lock function, the BURST line of bus 20 is connected to line 72 that is also connected to arbiter 50 and acts as a lock request over bus 20 from one of the remote processors. The conjunction of a BURST signal from the MC bus and an address on bus 20A completes a bus lock semaphore request. Arbiter 50 is also connected to line 74 that receives and drives the channel ready signal CHRDY for the channel ready line of MC bus 20.

A local arbiter 60 is provided for the purpose of allowing processor 22 to arbitrate for access to MC bus 20. Arbiter 60 conforms to the requirement for a local arbiter in accordance with the MC architecture and is connected to the arbitration signal lines 78 of MC bus 20. To accomplish arbitration, arbiter 60 receives a L REQ (lock request) signal from line 62. This L REQ signal is generated by an And circuit 64 which receives as inputs the LOCK signal from line 54 and an inverted PU COMP signal from inverter 66. When a LOCK signal is active and the addressed semaphore is not in memory 30 (indicating such request must be made through MC bus 20) so that PU COMP is inactive, And gate 64 generates the active L REQ signal. Local arbiter 60 then arbitrates through lines 78. Upon being granted use of the bus, arbiter 60 generates a BUS WON signal on line 68 that is fed to And gate 76 along with the LOCK signal. Gate 76 in turn drives line 72 and produces an active BURST signal on the MC bus 20 and thereby makes a lock request to access a remote memory. In conjunction therewith, a remote address to a remote semaphore is also transmitted on bus 20. The logic of controller 26 is thus effective to translate the LOCK signal into a BURST signal for a remote semaphore.

Figure 3:
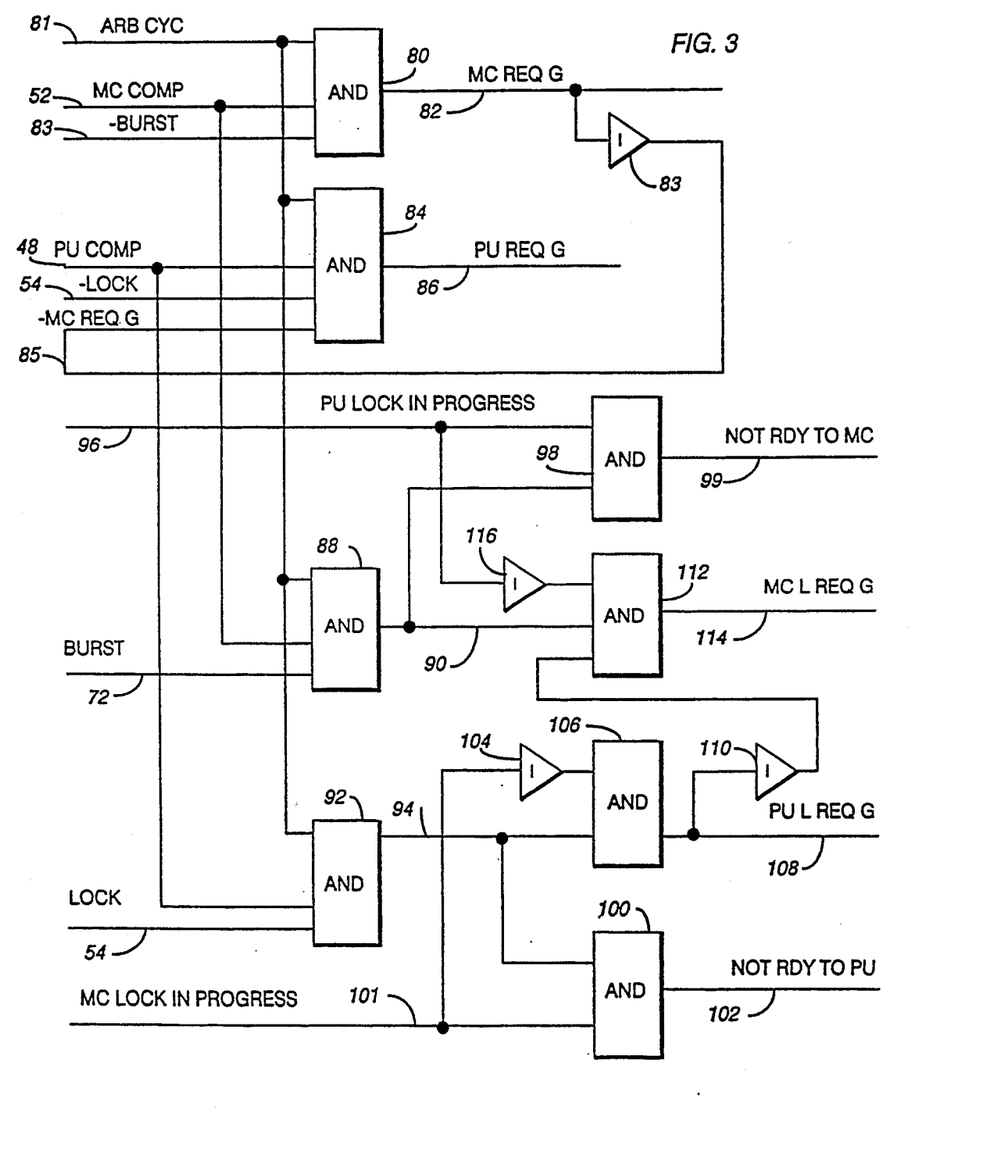
FIG. 3 is a detail block diagram of the memory arbiter shown in FIG. 2.

Memory arbiter 50 comprises a plurality of And gates and inverters (I) arranged as shown in FIG. 3. Capitalized signal names are inputted into and outputted from such circuits in accordance with the illustrated logic which should be obvious to those skilled in the art. A negative symbol (−) is used to indicate an inverted or "not active" signal. And circuit 80 has three input lines 81, 52, and 83 and one output line 82. When such input lines simultaneously respectively receive ARB CYC, MC COMP, and −BURST signals, gate 80 outputs an MC REQ G signal indicating that access has been granted to a request coming from the MC bus 20.

The output signal from gate 80 is inverted by an inverter 83 and fed into gate 84. Gate 84 also receives input signals ARB CYC, PU COMP, and −LOCK on lines 81, 48, and 54, and is operative in response to the simultaneous input of such signals to generate an output signal PU REQ G on line 86 indicating that the associated processor 22 has been granted access to memory 30. Both grant signals MC REQ G and PU REQ G are for non-locked or non-semaphore requests.

And gate 88 has an input line 72 connected to the BURST signal line of bus 20. Gate 88 also receives input signals MC COMP, and ARB CYC and, in response to simultaneously receiving all such input signals, provides an output signal on line 90 that is used in the manner described below to produce wait and grant signals NOT RDY TO MC and MC L REQ G. Line 99 is connected to line 74 and drives the channel ready line of MC bus inactive to allow additional time to complete the semaphore operation over the MC bus. Gate 92 receives input signals ARB CYC, PU COMP, and LOCK on lines 81, 48 and 54 and produces an output signal on line 94 that is inputted into gates 106 and 100. Gate 100 also receives an input signal MC LOCK IN PROGRESS on line 101 and produces on output line 102 a signal NOT RDY To PU indicating to the processor that it must wait for a lock access to memory 30 until an MC lock operation completes.

Line 101 is also connected as an input into inverter 104 whose output is fed into gate 106. Gate 106 has an output line 108 and produces an output signal PU L REQ G indicating that the processor has been granted access to the memory for a lock operation. Line 108 is also connected to inverter 110 whose output line is connected as an input into gate 112. Gate 112 is thus operative to produce output signal MC L REQ G which indicates that a request from the MC bus for a lock operation has been granted.

Figure 4:
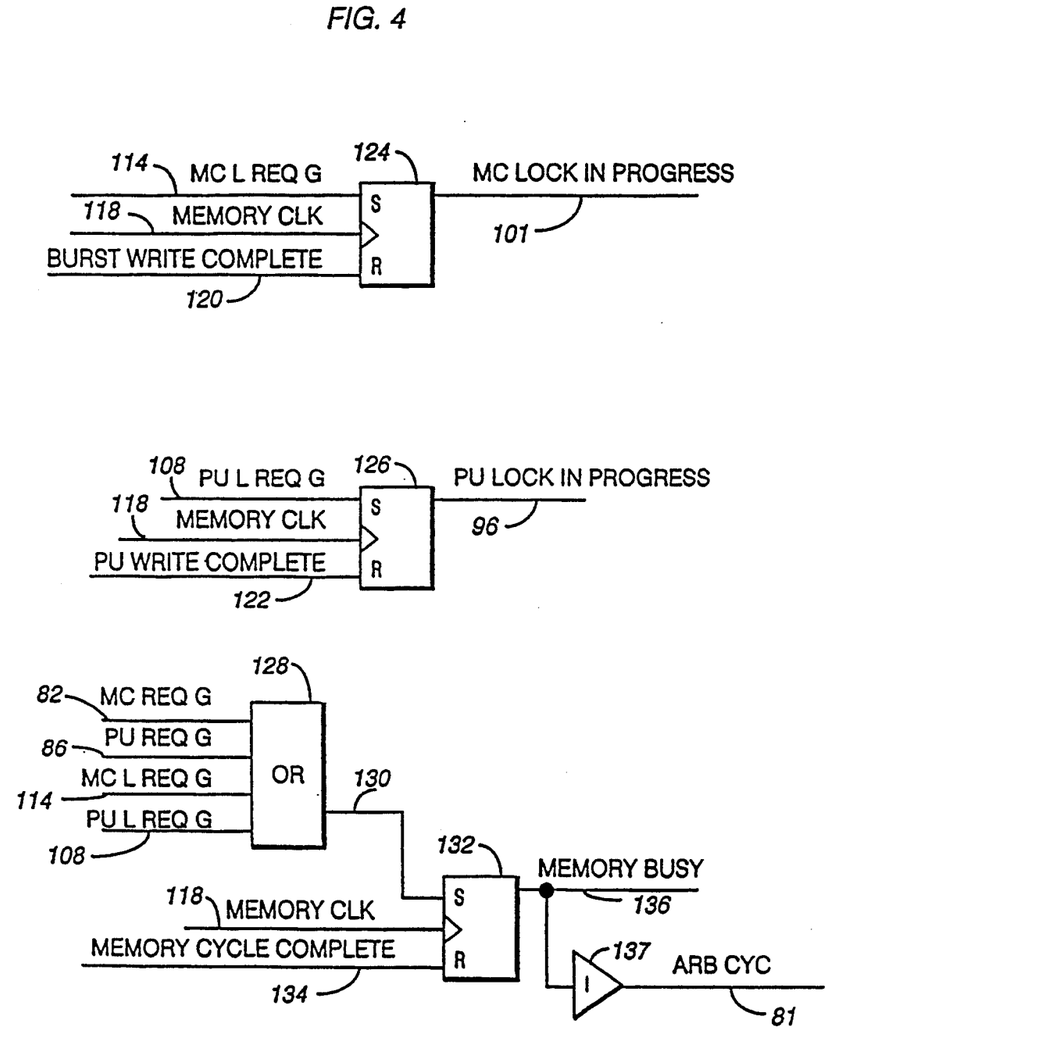
FIG. 4 is a logic diagram illustrating signals used in a semaphore-in-progress state, and in a memory-busy state.

Referring to FIG. 4, three positive edge triggered latches 124, 126 and 132 respectively produce output signals MC LOCK IN PROGRESS, PU LOCK IN PROGRESS, and MEMORY BUSY on lines 101, 96, and 136 when such latches are set. Each such latch is driven by a MEMORY CLK signal from a memory clock (not shown). Latch 124 has its set input (S) connected to line 114 and is set when the MC bus has been granted use for a lock operation. Latch 124 has a reset input (R) connected to line 120 to receive a BURST WRITE COMPLETE signal upon completion of a burst write operation. Such signal is derived from signals on the MC bus when such cycle is completed. Latch 126 has a set input connected to line 108 for receiving the PU L REQ G signal when access is granted to the processor. Upon receiving such signal, latch 126 is set to indicate that a processor lock operation is in progress. Upon completion of such operation, latch 126 receives on line 122 a signal PU WRITE COMPLETE which signal is activated at the completion of the memory cycle complete signal at the end of a write operation.

An OR circuit 128 has an output line 130 connected to the set input of latch 132. OR 128 is connected to input lines 82, 86, 114, and 108 for receiving the grant signals and setting latch 132 when a grant has been made to the processor or MC bus to access memory 30. When set, the MEMORY BUSY signal on line 136 can be used by the memory arbiter to indicate when arbiter 50 can be used again. Line 136 is connected to an inverter 137 for generating an ARB CYC on line 81 when line 136 is inactive. The reset line of latch 132 is connected to line 134 for receiving a MEMORY CYCLE COMPLETE signal from memory 30 when the memory has completed an access or memory cycle.

Memory controller 14 is constructed and operates the same as memory controller 26. Memory controller 33 is simpler since it is a single port controller and need not include any memory arbitration or locking functions. The access to controller 33 is determined by arbitration of the MC bus. Controllers 14 and 26 generally operate in the following manner. A lock semaphore operation may be initiated by a request from a local processor which request includes a LOCK signal and a semaphore address. Dependent upon such address, the request is routed to a memory arbiter to access the local memory or to a local arbiter to access the MC bus and a remote memory. To accomplish the latter, the LOCK signal is converted to a BURST signal upon being granted the use of the MC bus. The memory arbiter receives requests from both the local processor and the MC bus and grants access on a first come basis. When a second lock semaphore request is received while a first lock semaphore operation is in progress, the second request is delayed or blocked until completion of the first lock semaphore operation. If the first request is from the MC bus, the local processor can access the local memory for a non-lock access between the read and write cycles of the lock semaphore operation.

Figure 5:
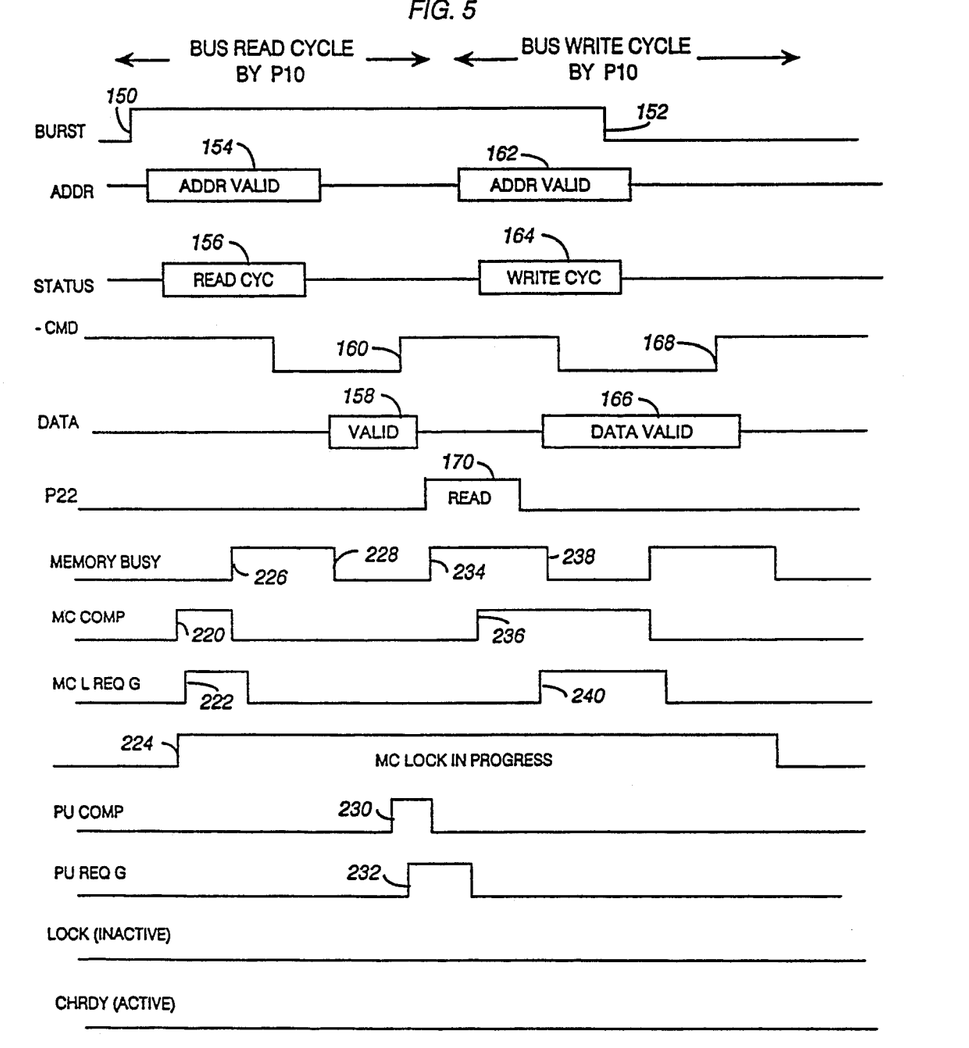
FIG. 5 is a timing diagram illustrating a bus semaphore operation and a processor non-semaphore access.

FIG. 5 illustrates a lock operation being performed over MC bus 20 by processor 10 (P10) on a semaphore 30S in memory 30 while processor 22 (P22) performs a non-lock memory 30 access between the bus read and write cycles of the semaphore operation. The LOCK signal is thus inactive in FIG. 5. At the start, it is assumed that processor 10 has requested use of bus 20 for a lock operation and that it has been granted use of the bus. Accordingly, CHRDY is driven active throughout FIG. 5. BURST is driven active at 150 after being granted the bus and remains active until, during the write cycle, it is deactivated at 152 allowing the bus to be granted to another requestor. The address of the semaphore is placed on the bus during period 154 and a read cycle is initiated by the STATUS lines of bus 20 in period 156. CHRDY is driven active for the operations shown in FIG. 5. The addressed semaphore is read onto bus 20 during period 158 and the −CMD signal, which is used to define when data is valid on the MC data bus, is driven so that its rising edge 160 allows the semaphore to be read or latched from the bus and interpreted by processor 10. The period of time that lapses between the beginning of period 154, when the address becomes valid, and edge 160 is a minimum of 200 nanoseconds in accordance with the architecture of MC bus 20. During the bus write cycle by P10, the address of the semaphore is placed on the bus 20 during period 162 and a write cycle is initiated in period 164. The semaphore data is placed on the bus 20 by processor 10 during period 166 and is written into memory upon the rising edge 168 of −CMD. The period of time that lapses between the beginning of period 162 when the address becomes valid, and edge 168 is also a minimum of 200 nanoseconds in accordance with the architecture of MC bus 20.

The speed at which current microprocessors can access fast memories is in the range 50 to 80 nanoseconds, which is much faster than the minimum period of 200 nanoseconds at which MC bus 20 can be operated. Thus, once the bus read cycle has been completed by P10, processor 22 can then access memory 30 during period 170. Such access occurs asynchronously and before CMD edge 168 appears. In other words, since the processor access period is must faster than the bus write cycle, there is a period at the beginning of the bus write cycle during which the processor can access memory, to thereby gain a performance advantage by allowing both operations to occur.

During the above operations, memory controller 26 acts as follows. After the semaphore address becomes valid in period 154 and a read cycle commences in 156, C/S 46 sends the MC COMP signal at 220 to arbiter 50. The BURST signal on 72 and ARB CYC on 81, along with an inactive LOCK signal (therefore no active PU LOCK nor PUL REQ G) activates the MC L REQ G at 222 causing the MC LOCK IN PROGRESS signal to be activated on the next memory clock signal (not shown). The MC L REQ G signal further activates the MEMORY BUSY signal at 226. While such signal would preclude granting a processor 22 lock request, as discussed below, it does not prevent a non-lock memory access from occurring.

Processor 22 starts a memory 30 access while the memory is not busy during 228 by placing the address on bus 24A causing PU COMP to become active at 230 thereby activating the PU REQ G signal at 232 due to an inactive LOCK signal. Thereupon, a read cycle occurs during period 170. Afterwards, the P10 bus write cycle proceeds. MC COMP goes active at 236 and upon inactivation of MEMORY BUSY at 238, the MC L REQ G is reactivated at 240.

Figure 6:
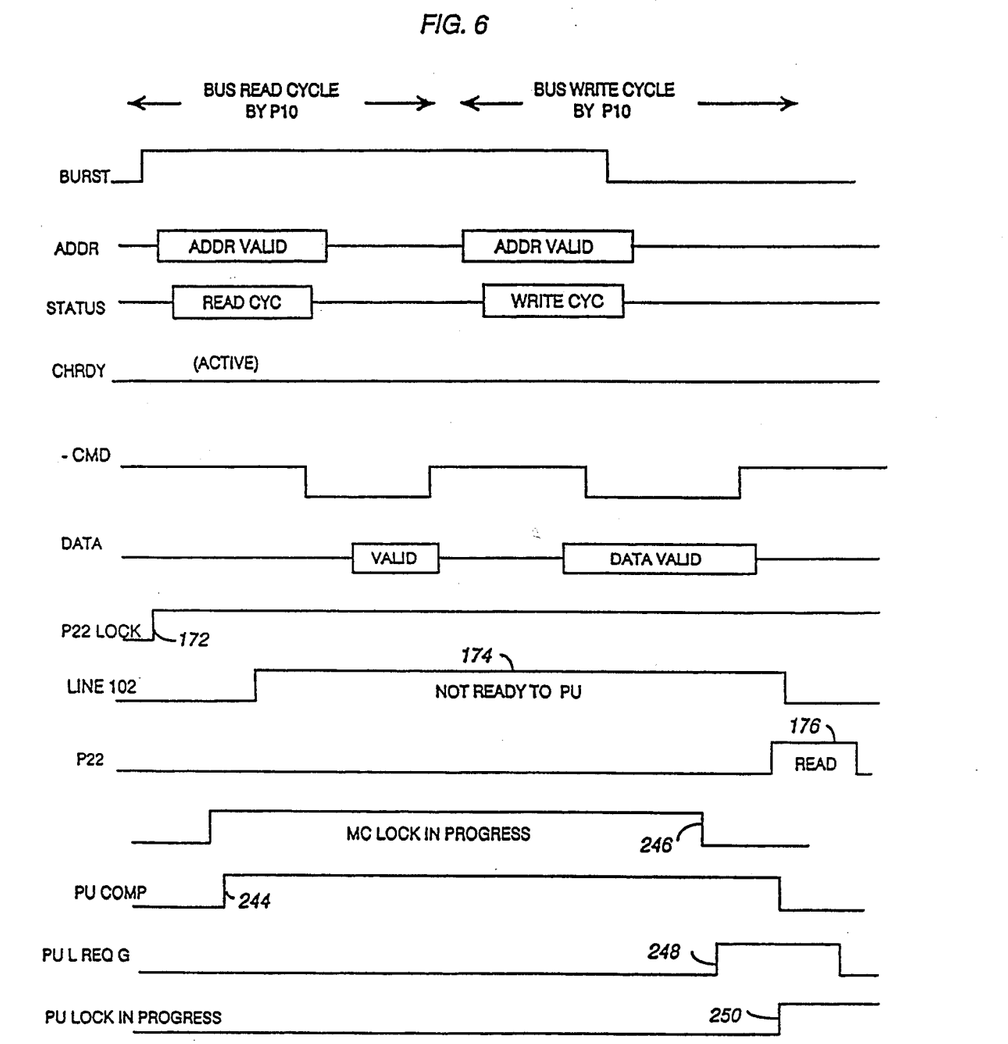
FIG. 6 is a timing diagram illustrating a semaphore bus operation and a processor semaphore request.

FIG. 6 illustrates what happens when a semaphore operation is being performed in memory 30 over MC bus 20 by P10. The bus semaphore operation is carried out in the same manner as described above relative to FIG. 5 except that processor 22 is not granted an intervening access for a lock operation. P22 activates LOCK at 172 shortly after P10 has raised the BURST signal. The MC LOCK IN PROGRESS signal is activated the same as in FIG. 5. When P22 sends out the address of the semaphore, C/S 44 recognizes such address is in memory 30 and activates the PU COMP signal at 244. Memory arbiter 50 then activates NOT READY TO PU signal for the period 174 in accordance with the logic shown in FIG. 3. Upon completion of the write cycle STATUS, the MC LOCK IN PROGRESS is deactivated at 246 thereby causing the PU L REQ G signal to become active at 248. The PC LOCK IN PROGRESS signal becomes active at 250 and P22 can begin its lock or semaphore operation by reading from memory 30 in period 176.

Figure 7:
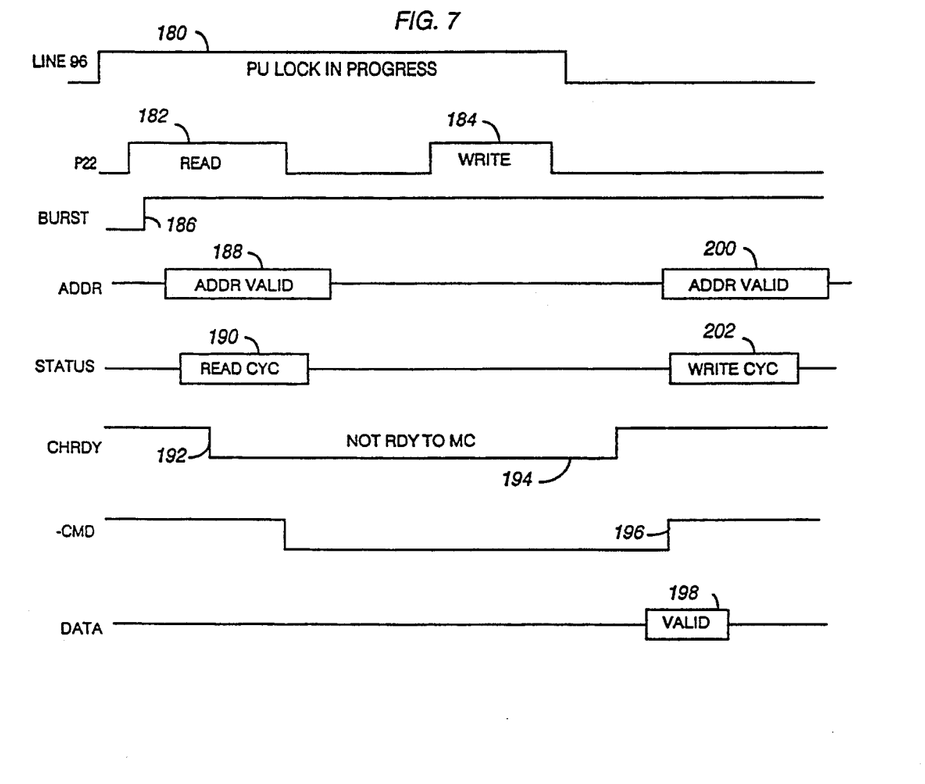
FIG. 7 is a timing diagram illustrating another processor semaphore operation and a bus semaphore request.

FIG. 7 illustrates a semaphore operation being performed by P22 on a semaphore in memory 30 and what happens when a subsequent request is made through MC bus 20 for another semaphore operation upon the same memory. During period 180, the PU LOCK IN PROGRESS signal is activated by memory arbiter 50 and maintained until completion of the write cycle 184 following read cycle 182. BURST is driven active at 186 followed by the semaphore address being placed on MC bus 20 during period 188. A read cycle is initiated in period 190. However, the PU LOCK IN PROGRESS signal causes the NOT RDY TO MC signal to be activated at 192 for the period 194 which ends upon completion of the processor semaphore operation. This causes CMD to be held low until 196 and the addressed semaphore can then be placed on bus 20 in period 198 to allow continuation of the MC requested semaphore operation.

In summary, the invention is believed unique in the following system aspects. First, the BURST line of the MC bus is used for two functions, a normal burst I/O transfer and a semaphore lock operation. This aspect also involves converting the LOCK signal from a processor into a BURST signal. Second, the resulting lock BURST signal is used to lock out a concurrent request for another lock or semaphore operation while allowing a concurrent request for a non-locked operation between the read and write cycles of the semaphore operation.

It should be apparent to those skilled in the art that many changes can be made in the details and arrangements of steps and parts without departing from the scope of the invention as defined in the appended claims.

What is claimed is:

1. A data processing system comprising;
   an expansion bus having address lines, data lines, and control lines including a BURST signal line for controlling burst I/O burst data transfers;
   a local processor;
   a remote processor;
   a remote memory having a remote semaphore at a first semaphore address;
   a remote memory controller connected to said remote memory for controlling access to said remote memory;
   first means interconnecting said local processor, said remote processor, said remote memory controller, and said expansion bus, to share said remote memory between said processors;
   said local processor being operative to initiate a first remote lock semaphore operation by generating a first LOCK signal and said first semaphore address;
   bus arbitration means connected to said expansion bus and to said local processor, said bus arbitration means being responsive to said first LOCK signal for arbitrating for use of said expansion bus by said local processor and for generating a BUS WON signal when said local processor has been granted use of said expansion bus;
   first logic means connected to said local processor, said expansion bus, and said bus arbitration means, said first logic means being responsive to said first LOCK signal and to said BUS WON signal to drive an active BURST signal onto said BURST line, said BURST line being used for remote lock semaphore operations as well as for controlling I/O burst data transfers;
   said local processor being further operative, upon being granted use of said expansion bus, to transmit said first semaphore address on said address lines when said BURST signal is active on said burst line;
   said remote memory controller includes memory arbitration means connected to said BURST signal line and being responsive to said active BURST signal and to said semaphore address, to arbitrate and permit said local processor to access said remote memory; and
   said local processor being further operative to perform read/modify/write cycles on said remote semaphore, to thereby complete said first remote lock semaphore operation.

2. A data processing system in accordance with claim 1 wherein:
said remote processor being selectively operable to initiate a non-lock access to said remote memory while said remote lock semaphore operation is in progress;
said remote processor is connected to said memory arbitration means, said remote processor being operable to selectively generate a second LOCK signal having an active state and an inactive state, said memory arbitration means being operative in response to said inactive state of said second LOCK signal to grant said non-lock access to said remote memory between the read and write cycles of said remote lock semaphore operation.

3. A data processing system in accordance with claim 2 wherein:
said memory arbitration means is operable in response to said active state of said second LOCK signal to block a local lock semaphore access to said remote memory by said remote processor when said remote lock semaphore operation is in progress.

4. A data processing system in accordance with claim 3 comprising:
second logic means connected to said remote processor for causing said remote processor to wait while said local lock semaphore access is blocked, and, upon said remote lock semaphore operation being completed, for allowing said remote processor to perform a local lock semaphore access by said remote processor to said remote semaphore.

5. A data processing system in accordance with claim 1 comprising:
a local memory for storing a second semaphore at a second semaphore address;
a local memory controller for controlling access to said local memory, said local memory controller having dual ports, one port being connected to said local processor and one port being connected to said expansion bus, said first logic means being included in said local memory controller;
said remote processor being selectively operable to generate a third LOCK signal and said second semaphore address to initiate a second remote lock semaphore operation on said local semaphore;
said remote memory controller having second logic means responsive to a LOCK signal and said address of said local semaphore from said remote processor to drive an active BURST signal onto said expansion bus and transmit said address of said local semaphore to said local memory controller;
and said local memory controller including arbitration means operable to grant access by said remote processor to said local memory for a lock semaphore operation on said local semaphore.

6. A memory controller for use in a data processing system comprising a local memory for storing a first semaphore at a first address, an expansion bus including a burst signal line and address lines for respectively transmitting a BURST signal and ADDRESS signals, a remote memory connected to said expansion bus for storing a second semaphore at a second address, a processor for selectively emitting lock semaphore requests for accessing said first and second semaphores, each lock semaphore request from said processor including a LOCK signal and ADDRESS signals of one of said semaphores, a remote requestor connected to said expansion bus for transmitting lock semaphore requests from said remote requestor to said memory controller for accessing said first semaphore, each lock semaphore request from said requestor including a BURST signal and said first address, said memory controller comprising:
connecting means for respectively connecting said memory controller to said processor, said expansion bus, and said local memory;
access control means connected to said connecting means for granting access to said local memory for lock semaphore operations upon said first semaphore in response to lock semaphore requests from said processor that include said first address;
said access control means including a memory arbiter for receiving lock semaphore requests from said processor and from said remote requestor over said expansion bus, and determining which request will be granted access to said local memory;
said logic means connected to said processor and to said expansion bus, said logic means being operable, in response to lock semaphore requests from said processor, to access said remote semaphore, and to convert said LOCK signal of each said request into a BURST signal for transmission on said expansion bus.

7. A memory controller in accordance with claim 6 comprising:
a local arbiter connected to said processor, said logic means, and said expansion bus for receiving a request from said processor to access said remote semaphore and requesting use of said expansion bus by said processor, said local arbiter being operable to emit a BUS WON signal upon being granted use of said expansion bus and transmit said BUS WON signal to said logic means;
said logic means being operable to convert said LOCK signal into said BURST signal upon receipt of said BUS WON signal.

8. A memory controller in accordance with claim 7 wherein said local memory has a multiplicity of addressable locations contiguous over a range of addresses including said first address, said memory controller comprising:
address coparison means connected to said connecting means for comparing each semaphore address from said processor with said range and directing a request to said access control means or said local arbitor dependent upon whether such semaphore address is within said range or outside said range respectively.

9. A memory controller in accordance with claim 6 wherein:
said memory arbiter is operable in response to receiving a second request for a second lock semaphore access to said local memory while a first lock semaphore operation is in progress to delay granting access to said second request until said first lock semaphore operation is completed.

10. A memory controller in accordance with claim 6 wherein said memory arbiter is operable, in response to receiving a non-lock request from said processor for accessing said local memory when a prior lock semaphore operation requested over said expansion bus is in progress, to grant access to said local memory for such non-lock request between read and write cycles of said prior lock semaphore operation.

* * * * *